(12) United States Patent
Nishikawa

(10) Patent No.: US 6,891,594 B2
(45) Date of Patent: May 10, 2005

(54) PRINTING DEVICE AND PHOTOGRAPH PROCESSING APPARATUS EQUIPPED WITH SUCH A DEVICE

(75) Inventor: Hidetoshi Nishikawa, Wakayama (JP)

(73) Assignee: Noritsu Koki Co., Ltd., Wakayama (JP)

(*) Notice: Subject to any disclaimer, the term of this patent is extended or adjusted under 35 U.S.C. 154(b) by 0 days.

(21) Appl. No.: 10/245,894

(22) Filed: Sep. 17, 2002

(65) Prior Publication Data

US 2003/0016336 A1 Jan. 23, 2003

Related U.S. Application Data

(63) Continuation of application No. 09/561,729, filed on Apr. 28, 2000, now Pat. No. 6,517,055.

(30) Foreign Application Priority Data

Apr. 30, 1999 (JP) .............................................. 11-124570

(51) Int. Cl.[7] .......................... G03B 27/32; G03B 27/72; G03B 27/54
(52) U.S. Cl. .............................. 355/32; 355/35; 355/67
(58) Field of Search .............................. 355/32, 18, 35, 355/27, 40, 38, 41; 349/2, 79; 358/504, 527

(56) References Cited

U.S. PATENT DOCUMENTS

| 4,229,095 A | 10/1980 | Mir ................................ 355/4 |
| 4,357,625 A | 11/1982 | Lamberts et al. .............. 358/75 |
| 5,475,493 A | 12/1995 | Yamana ........................ 356/404 |
| 5,488,450 A | 1/1996 | Tanibata ........................ 355/38 |
| 5,734,460 A | 3/1998 | Nakaoka et al. ............... 355/29 |
| 5,751,385 A | 5/1998 | Heinze .......................... 349/53 |
| 5,861,929 A | 1/1999 | Spitzer .......................... 349/74 |
| 5,864,390 A * | 1/1999 | Johnson et al. ................ 355/67 |

FOREIGN PATENT DOCUMENTS

| EP | 0 615 154 A 1 | 9/1994 |
| JP | 61-230117 | 10/1986 |
| JP | 62-184445 | 8/1987 |
| JP | 06-230486 | 8/1994 |
| JP | 10-010566 | 1/1998 |

OTHER PUBLICATIONS

XP000429064—J.R. Trimmier, et al., High–Resolution, Subtractive Color, Active–Matrix, Liquid Crystal Light Valve, 8270, Scientific Honeyweller User Interface Issue (1993), Minneapolis, MN, US.
European Search Report.
Japanese Intellectual Property Office First Office Action dated Dec. 24,2002 (2pp.) and English translation (4 pp.).

* cited by examiner

Primary Examiner—Peter B. Kim
(74) Attorney, Agent, or Firm—Edwards & Angell, LLP; David G. Conlin; George W. Hartnell, III

(57) ABSTRACT

In a printing device which prints a color image on a photosensitive material by allowing an exposing head to modulate light from a light source for each pixel in accordance with image information, the exposing head is constituted by superposing three LCS's in the light-axis direction. The respective LCS's control the transmission and interruption of only the respective blue, green and red color components so that color tones in the respective pixels with respect to an image printed on printing paper are controlled based upon the subtractive color process. Therefore, it is possible to eliminate the generation of pixel offsets in an image printed on the photosensitive material by using a simple structure, and consequently to provide a printing device having a superior processability.

9 Claims, 10 Drawing Sheets

PRINTING DEVICE AND PHOTOGRAPH PROCESSING APPARATUS EQUIPPED WITH SUCH A DEVICE

CROSS REFERENCE TO RELATED APPLICATIONS

This application is a continuation of U.S. Ser. No. 09/561,729, filed Apr. 28, 2000 now U.S. Pat. No. 6,517,055.

FIELD OF THE INVENTION

The present invention relates to a printing device which is installed in, for example, a photograph printer, and which prints an image on a photosensitive material by directing light from a light source on the photosensitive material through a light modulation element such as a liquid crystal display element, and also concerns a photograph processing apparatus equipped with such a printing device.

BACKGROUND OF THE INVENTION

Conventionally, various printing devices have been proposed in which an image is displayed by a liquid crystal display element (hereinafter, referred to as LCD (Liquid Crystal Display) and light from a light source is directed to a photosensitive material through this LCD so as to print the image. In the printing device of this type, for example, a film image is acquired as image data consisting of a plurality of pixels, and pixels on the LCD are modulated in accordance with the image data thus acquired so that the photosensitive material is exposed.

In the above-mentioned conventional printing device, in the case when a color image is printed on a photosensitive material, color exposure is carried out based upon the so-called additive color process. In other words, the system which represents a color image by superposing light rays having blue (B), green (G) and red (R) components is adopted.

The following description will discuss a structural example of the conventional printing device. FIG. 7 is a perspective view that schematically shows the construction of the printing device which is provided with an LCD and carries out face exposure. Here, the printing device having such a construction is referred to as a printing device of one-head face exposure system.

This printing device of one-head face exposure system is provided with a light source 51 for emitting white light, a BGR filter 52 having filters corresponding to the respective colors of blue, green and red, an LCD 53 and a printing lens 54. Light, released from the light source 51, is made incident on the LCD 53 after passing through any of the filters of the respective colors in the BGR filter 52. The light, made incident on the LCD 53, is modulated by the LCD 53 that displays image information corresponding to a color at this time, and then directed onto printing paper 55 as a photosensitive material through the printing lens 54. An image as a whole to be printed is displayed on the LCD 53, and the image is printed on the printing paper 55 that is placed at rest.

As described above, in the printing device of the one-head face exposure system, color exposure is carried out by using the BGR filter 52. In other words, for example, when the filter corresponding to blue is being used, image information corresponding blue is displayed on the LCD 53 so that an exposing process of the blue component of the image is carried out on the printing paper 55, and the same exposing processes of the green and red components are then carried out in this order so as to print the color image.

FIG. 8 is a perspective view that schematically shows the construction of a printing device which is provided with light sources and LCDs that correspond to the respective colors of blue, green and red, and carries out face exposure. Here, the printing device having such a construction is referred to as a printing device of three-head face exposure system.

This printing device of three-head face exposure system is provided with three light sources 51B, 51G and 51R for respectively emitting blue light, green light and red light, three LCDs 53B, 53G and 53R, a composition prism 56 and a printing lens 54. Light rays, released from the light sources 51B, 53G and 53R, are made incident on the corresponding LCDs 53B, 53G and 53R, and modulated in accordance with image information for the respective colors. The resulting light rays, released from the LCDs 53B, 53G and 53R are composed by the composition prism 56, and projected onto printing paper 55 through the printing lens 54. An image as a whole to be printed is displayed on each of the LCDs 53B, 53G and 53R for each of the colors, and the image is printed on the printing paper 55 that is placed at rest.

As described above, in the printing device of the three-head face exposure system, the light sources 51B, 51G and 51R and the LCDs 53B, 53G and 53R are used for directing image light rays of the blue, green and red components to the composition prism 56 simultaneously so that an exposing process is carried out on the printing paper 55 by using color image light rays from the composition prism 56.

FIG. 9 is a perspective view that schematically shows the construction of a printing device which is provided with light sources and LCS's (Liquid Crystal Shutters) that correspond to the respective colors of blue, green and red, and carries out scanning exposure by directing parallel light rays from the respective LCS's onto printing paper. In this case, LCS refers to a liquid crystal element in which respective pixels are aligned in one row or in several rows. Here, the printing device having such a construction is referred to as a printing device of three-head parallel scanning exposure system.

This printing device of three-head parallel scanning exposure system is provided with three light sources 51B, 51G and 51R for respectively emitting blue light, green light and red light, three LCS's 57B, 57G and 57R, and three rod lens arrays 58B, 58G and 58R. Light rays, released from the light sources 51B, 51G and 51R, are made incident on the corresponding LCS's 57B, 57G and 57R, and modulated in accordance with image information for the respective colors. The resulting light rays, released from the LCS's 57B, 57G and 57R are projected onto printing paper 55 through the respective rod lens arrays 58B, 58G and 58R. Image data corresponding to one row or several rows of an image to be printed is displayed on the LCS's 57B, 57G and 57R for the respective colors, and scanning exposure is carried out by transporting the printing paper 55 in a direction orthogonal to the length direction of the respective LCS's.

As described above, in the printing device of the three-head parallel scanning exposure system, the light sources 51B, 51G and 51R and the LCS's 57B, 57G and 57R are used for directing image light rays of the blue, green and red components onto the printing paper 55 in parallel with each other. Then, the display timing of the LCS's 57B, 57G and 57R is controlled based upon the relationship between the distance between irradiation positions of the respective colors and the transporting speed of the printing paper 55 so that a color exposing process is carried out on each of the respective pixels of the image to be printed.

FIG. 10 is a perspective view that schematically shows the construction of a printing device which is provided with light sources and LCS's (Liquid Crystal Shutters) that correspond to the respective colors of blue, green and red, and carries out scanning exposure by directing light composed by light rays from the respective LCS's onto printing paper. Here, the printing device having such a construction is referred to as a printing device of three-head composition scanning exposure system.

This printing device of three-head composition scanning exposure system is provided with three light sources 51B, 51G and 51R for respectively emitting blue light, green light and red light, three LCS's 57B, 57G and 57R, a composition prism 56 and a rod lens arrays 58. Light rays, released from the light sources 51B, 51G and 51R, are made incident on the corresponding LCS's 57B, 57G and 57R, and modulated in accordance with image information for the respective colors. The resulting light rays, released from the LCS's 57B, 57G and 57R are composed by the composition prism 56, and projected onto printing paper 55 through the respective the rod lens array 58. Image data corresponding to one row or several rows of an image to be printed is displayed on the LCS's 57B, 57G and 57R for the respective colors, and scanning exposure is carried out by transporting the printing paper 55 in a direction orthogonal to the length direction of the respective LCS's.

As described above, in the printing device of the three-head composition scanning exposure system, the light sources 51B, 51G and 51R and the LCS's 57B, 57G and 57R are used for directing image light rays of the blue, green and red components onto the composition prism 56 simultaneously, and the resulting color image light rays from the composition prism 56 are used for exposing the printing paper.

In the case of the printing device of one-head face exposure system as shown in FIG. 7, a color image is printed by carrying out serial exposing processes in the order of blue, green and red colors as described above. Therefore, as compared with the arrangement for carrying out exposing processes with the respective colors simultaneously, this system has a problem of low processability.

In the case of the printing device of three-head face exposure system as shown in FIG. 8, as described above, image light rays of the blue, green and red components are composed by using the composition prism 56, and the light rays corresponding to the respective colors are simultaneously directed onto the printing paper 55. In this manner, when the composition prism 56 is used, the aligning positions and aligning directions of the composition prism 56 and the LCDs 53B, 53G and 53R need to be set very accurately so as to keep an accurate positional relationship between the respective pixels representative of the respective color components of the image light rays; this causes an increase in production costs as well as manufacturing time. Moreover, the composition prism 56, which is a comparatively expensive member, also causes an increase in material costs.

In the printing device of three-head parallel scanning exposure system as shown in FIG. 9, as described above, a scanning exposure process is carried out while the image light rays of the blue, green and red components are directed to respectively different positions on the printing paper 55. In this arrangement, the image display timing of the LCS's 57B, 57G and 57R has to be controlled precisely so that the respective color components of the pixels in an image to be printed on the printing paper 55 are accurately superposed on each other. In other words, data corresponding to the respective pixels need to be displayed in different timing for the respective color components; this makes the image controlling process more complex.

Moreover, the image display timing is set based upon the relationship between the gap of the light rays of the respective color components and the transporting speed of the printing paper 55; however, in the event of an error in these values, pixel offsets, which are caused by offset exposing light rays of the respective color components, tend to occur in the respective pixels. Moreover, in the case when the aligned position of the optical system is offset with respect to the image light rays of the respective color components, the above-mentioned pixel offsets tend to occur. In other words, the system of this type is highly susceptible to the occurrence of pixel offsets.

In the printing device of three-head composition scanning exposure system as shown in FIG. 10, as described above, the image light rays of the blue, green and red components are composed by the composition prism 56, and while simultaneously projecting the light rays of the three colors onto printing paper 55, scanning exposure is carried out. As described above, when the composition prism 56 of this type is used, the aligning positions and aligning directions of the composition prism 56 and the LCS's 57B, 57G and 57R need to be set very accurately so as to keep an accurate positional relationship between the respective pixels representative of the respective color components of the image light rays; this causes an increase in production costs as well as manufacturing time. Moreover, the composition prism 56, which is a comparatively expensive member, also causes an increase in material costs.

SUMMARY OF THE INVENTION

The present invention relates to a printing device which prints a color image on a photosensitive material by modulating light from a light source for each pixel in accordance with image information, and its objective is to provide a superior printing device with high processability which is less susceptible to pixel offsets in the image printed on the photosensitive material by using a simple construction.

In order to achieve the above-mentioned objective, the printing device of the present invention is provided with:

a light source; and an exposing means for modulating light from the light source for each pixel and for directing the resulting light to a photosensitive material, the exposing means being provided with a plurality of light modulating elements which control the transmission and interruption of light rays having respectively different specific wavelength bands and which transmit light rays having the other wavelength bands, the light modulating elements being aligned in a light-axis direction so as to correspond to the respective pixels, wherein color tones in the respective pixels with respect to an image printed on printing paper are controlled based upon the subtractive color process by allowing the respective light modulating elements to control the transmission and interruption of light rays having respectively specific wavelength bands.

With the above-mentioned arrangement, the exposing means has an arrangement in which a plurality of light modulating elements are aligned in the light axis direction so as to correspond to the respective pixels, and color tones in the respective pixels with respect to an image printed on printing paper are controlled based upon the subtractive color process by allowing the respective light modulating elements to control the transmission and interruption of light rays having respectively specific wavelength bands; therefore, it is possible to eliminate the need for constructions such as a composition prism for composing light rays having respective color components. Thus, it becomes possible to simplify the structure, and consequently to reduce production costs and material costs.

Moreover, since the light modulating elements are placed in parallel with each other in the light axis direction, it is possible to make the size of the exposing means itself comparatively smaller. Therefore, it becomes possible to make the apparatus itself smaller, and also to increase the degree of freedom in arranging the constituent elements.

Furthermore, the light modulating elements are aligned in the light axis direction in association with the respective pixels, so that light rays having the respective wavelength bands in the respective pixels are directed on the same position on a photosensitive material. Therefore, it is possible to eliminate the generation of pixel offsets in an image printed on the photosensitive material, and consequently to provide high-quality images.

Here, since the light rays having the respective wavelength bands are simultaneously directed onto the photosensitive material, the exposing speed can be increased, for example, as compared with an arrangement in which light rays having the respective wavelength bands are exposed in series with each other.

Moreover, the photograph processing apparatus of the present invention is provided with:

a printing device for carrying out a digital exposing process on a photosensitive material based upon image data;

a developing section for developing the photosensitive material that has been subjected to the printing process by the printing device by using a developer; and a drying section for drying the photosensitive material that has been subjected to the developing process by the developing section, wherein the printing device is provided with:

a light source; and an exposing means for modulating light from the light source for each pixel and for directing the resulting light to a photosensitive material, the exposing means being provided with a plurality of light modulating elements which control the transmission and interruption of light rays having respectively different specific wavelength bands and which transmit light rays having the other wavelength bands, the light modulating elements being aligned in a light-axis direction so as to correspond to the respective pixels, wherein color tones in the respective pixels with respect to an image printed on printing paper are controlled based upon the subtractive color process by allowing the respective light modulating elements to control the transmission and interruption of light rays having respectively specific wavelength bands.

With the above-mentioned arrangement, first, in the printing device, the exposing means has an arrangement in which a plurality of light modulating elements are aligned in the light axis direction so as to correspond to the respective pixels, and color tones in the respective pixels with respect to an image printed on printing paper are controlled based upon the subtractive color process by allowing the respective light modulating elements to control the transmission and interruption of light rays having respectively specific wavelength bands; therefore, it is possible to eliminate the need for constructions such as a composition prism for composing light rays having respective color components. Thus, it becomes possible to simplify the structure, and consequently to reduce production costs and material costs.

Here, since the light modulating elements are placed in parallel with each other in the light axis direction, it is possible to make the size of the exposing means itself comparatively smaller. Therefore, it becomes possible to make the apparatus itself smaller, and also to increase the degree of freedom in arranging the constituent elements.

Moreover, the light modulating elements are aligned in the light axis direction in association with the respective pixels, so that light rays having the respective wavelength bands in the respective pixels are directed on the same position on a photosensitive material. Therefore, it is possible to eliminate the generation of pixel offsets in an image printed on the photosensitive material, and consequently to provide high-quality images.

Here, since the light rays having the respective wavelength bands are simultaneously directed onto the photosensitive material, the exposing speed can be increased, for example, as compared with an arrangement in which light rays having the respective wavelength bands are exposed in series with each other.

Moreover, since the printing device, the developing section and the drying section are installed as described above, the exposing, developing and drying processes of the photosensitive material are continuously carried out under one unified control. Consequently, it is possible to continuously print a large number of photographs without giving any operational burden to the user.

For a fuller understanding of the nature and advantages of the invention, reference should be made to the ensuing detailed description taken in conjunction with the accompanying drawings.

DESCRIPTION OF THE EMBODIMENTS

Referring to FIGS. 1 through 6, the following description will discuss one embodiment of the present invention.

Figure 2:
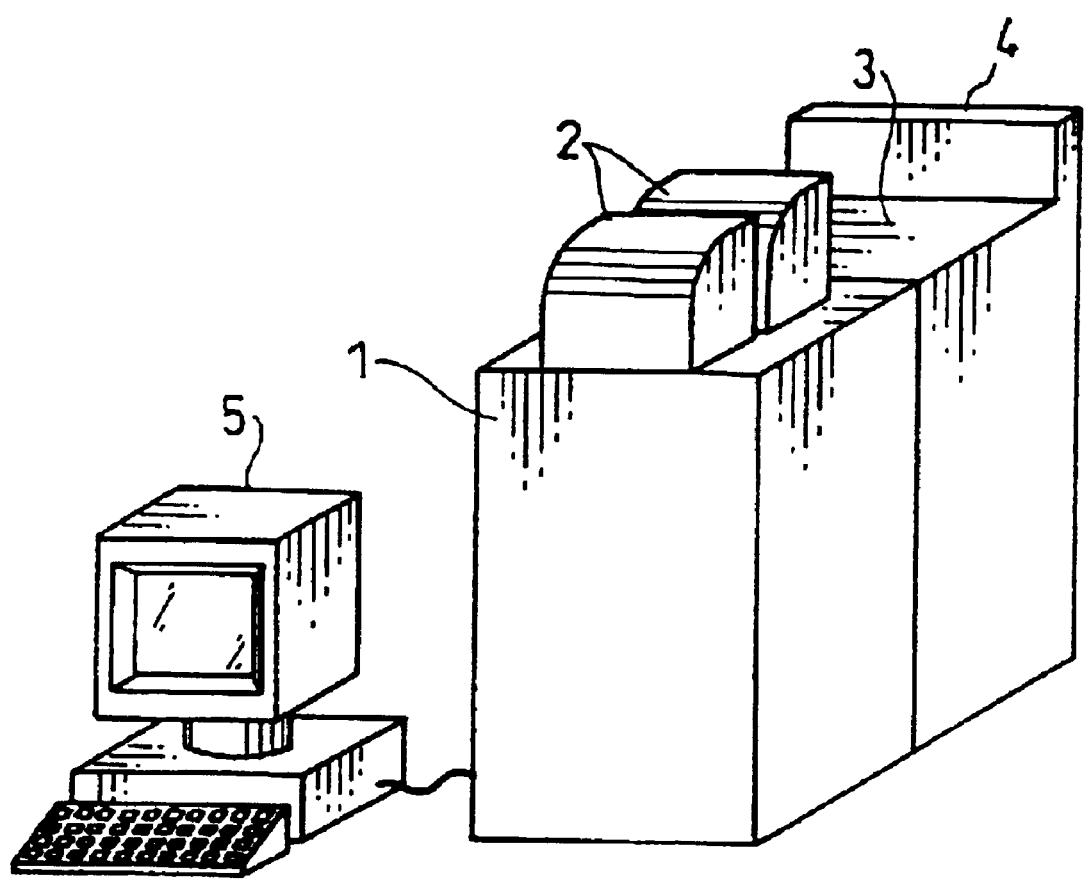
FIG. 2 is a perspective view that schematically shows the construction of the photograph processing apparatus.

FIG. 2 is a perspective view that schematically shows a photograph processing apparatus in accordance with the embodiment of the present invention. The photograph processing apparatus is provided with a printing section (printing device) 1, paper magazines 2, a developing section 3, a drying section 4 and a PC (Personal Computer) 5.

The printing section 1 carries out an exposing process by irradiating a sheet of printing paper with light representative of image information. Here, the printing paper serves as a photosensitive material and is transported from the paper magazine 2. The developing section 3 carries out a developing process by transporting the printing paper subjected to the exposure at the printing section 1 while applying a developing liquid thereon. The drying section 4 dries the printing paper that has been subjected to the developing process at the developing section 3, which is the last printing process. The PC 5 is used for storing image data of an image to be printed and for executing various data processing on the image data.

As described above, the photograph processing apparatus of the present embodiment has an arrangement in which the exposing, developing and drying processes of the printing paper are continuously carried out under one unified control. Consequently, it is possible to continuously print a large number of photographs without giving any operational burden to the user.

Figure 3:
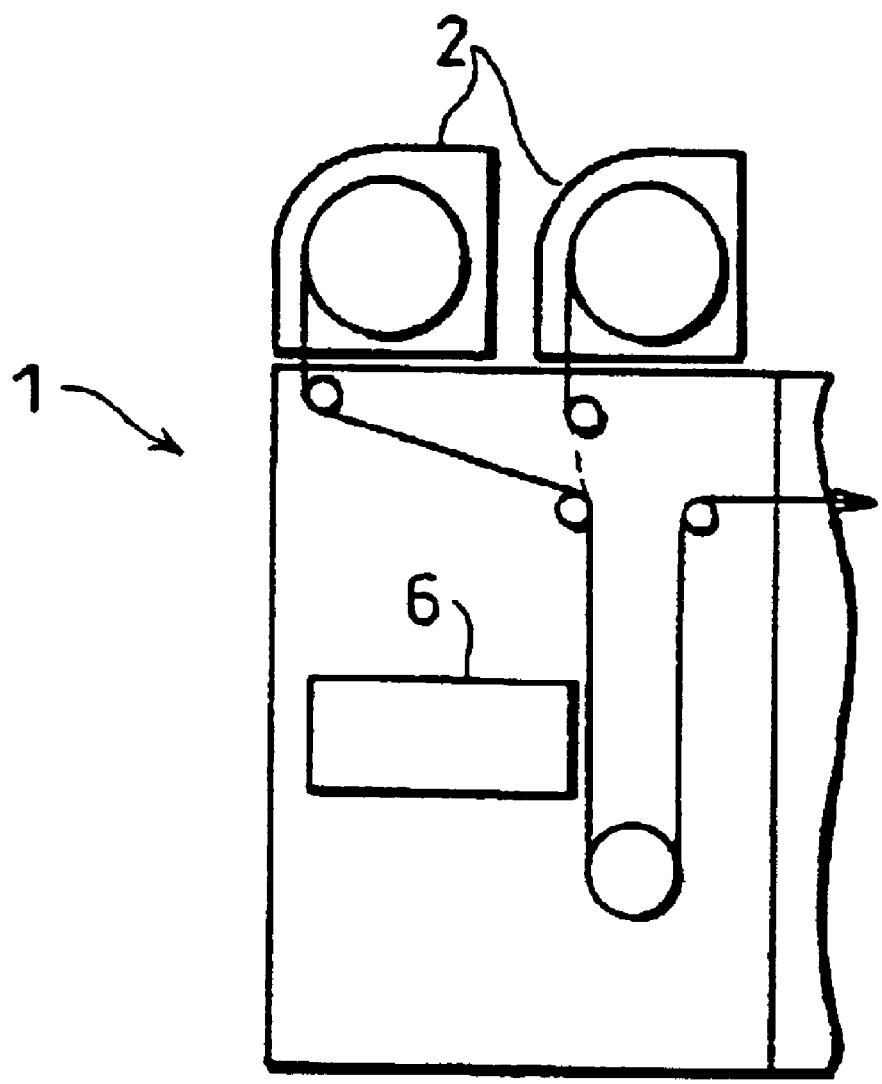
FIG. 3 is a cross-sectional side view that schematically shows the construction of a printing section installed in the photograph processing apparatus.

FIG. 3 is a side view that schematically shows the construction of the printing section 1. The two paper magazines 2, each housing printing paper in a roll shape, are placed on the upper portion of the printing section 1. Rolls of printing paper having respectively different sizes are housed in the paper magazines 2 so that printed photographs of two kinds are available by switching these upon transporting printing paper.

The printing paper, fed from the paper magazines 2, is transported to a lower portion of the printing section 1 by transport rollers, and after having been again transported to an upper portion thereof, it is then discharged from the printing section 1 toward the next developing section 3. Here, the printing paper transported to the lower portion of the printing section 1 from the paper magazine 2 is subjected to an exposing process by an exposing section 6.

Figure 1:
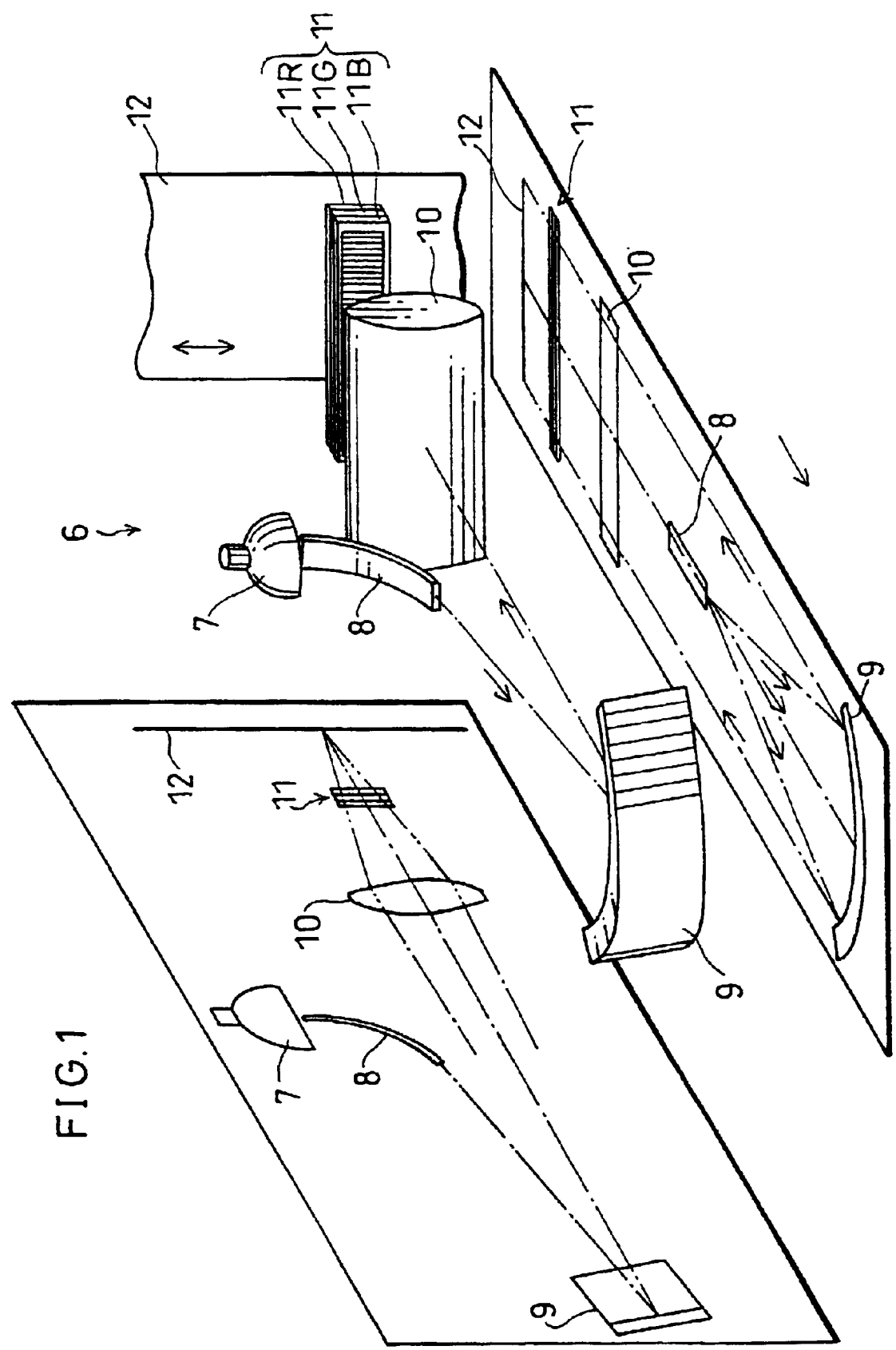
FIG. 1 contains a perspective view, a projection side view and a projection plan view that schematically show the construction of an exposing section installed in a photograph processing apparatus in accordance with one embodiment of the present invention.

FIG. 1 includes a perspective view that schematically shows the construction of the exposing section 6, a projection side view and a projection plan view that correspond to this perspective view. The side view showing the exposing section 6 seen from the left side is given on the left side of the perspective view, and the plan view showing the exposing section 6 seen from below is given below the perspective view. The exposing section 6 is provided with a light source 7, a light guide 8, a concave mirror (light conversion means) 9, a cylindrical lens (light-converging means) 10, and an exposing head (exposing means) 11.

The light source 7 is constituted by a lamp section consisting of, for example, a halogen lamp, etc., a reflector that reflects light released from the lamp section in a direction to the light guide 8, a socket section which supports the lamp section and the reflector at predetermined positions, and supplies power to the lamp section, etc. The light released from the lamp section contains all light rays having respective components of blue, green and red, and is a white light with a slight redish tint. This white light with a slight redish tint is used so as to compensate for the fact that printing paper 12 is weaker in its red-color emitting property as compared with other colors. The shape of the reflection face of the reflector is designed in such a manner that the light, released from the lamp section, is directed to the light incident face of the light guide 8.

The light guide 8 is used for directing the light released from the light source 7 in a direction to the concave mirror 9. The light guide 8 is made of a transparent substance such as, for example, glass, and has a construction in which, in a cross-section thereof in a direction perpendicular to the transmitting direction of the light, its refractive index varies discontinuously from the center to the periphery thereof. With this construction, the light which is made incident on the light incident face is allowed to pass inside thereof while repeating total reflections, and is released from the light releasing face.

The concave mirror 9 reflects the light released from the light releasing face of the light guide 8 in a direction to the cylindrical lens 10. The concave mirror 9 has a linear cross section in its reflection face on a plane including the transportation direction of printing paper 12 and the light reflection direction, and also has a parabolic cross section or the like cross section having its focal point on the center of the light releasing face of the light guide 8 in its reflection face on a plane including a direction perpendicular to the transportation direction of the printing paper 12 in the paper face of the printing paper 12 and the light reflection direction. This shape of the cross section of the reflection face on the plane including a direction perpendicular to the transportation direction of the printing pater 12 in the paper face of the printing paper 12 is designed so that the light, released from the light guide 8 and diffused in a delta shape, is allowed to form virtually parallel light rays after having been reflected by the concave mirror 9.

Here, supposing that the light releasing face of the light guide 8 is a complete point light source, the reflected light forms complete parallel light rays by optimizing the shape of the reflection face of the concave mirror 9; however, in fact, since the light releasing face of the light guide 8 has an area to a certain extent, the reflected light from the concave mirror 9 fails to form complete parallel light rays. For this reason, in the above-mentioned description, the reflected light from the concave mirror 9 is referred to as "virtually parallel light rays."

The cylindrical lens 10 is used for converging the light reflected from the concave mirror 9 toward the exposing head 11. The cylindrical lens 10 has a lens shape in its cross section on a plane including the transporting direction of the printing paper 12 and the light axis direction, that is, a shape for converging light that is made incident thereon, and also has a rectangular shape in its cross section on a plane including a direction perpendicular to the transportation direction of the printing pater 12 in the paper face of the printing paper 12 and the light axis direction, that is, a shape allowing the incident light to release without being refracted.

The exposing head 11 has an arrangement in which LCS's (light modulating elements) 11B, 11G and 11R, corresponding to the respective colors of blue, green and red, are superposed in the light axis direction. Each of these LSC's has an arrangement in which respective pixels are aligned in one row or several rows in a liquid crystal element. Upon passing through the exposing head 11, the light, which has passed through the cylindrical lens 10, is modulated by each of the pixels, and directed onto the printing paper 12 as image light representative of image information. Here, a detailed explanation of the construction of the exposing head 11 will be described later.

Next, an explanation will be given of an exposing operation in the exposing section 6 having the above-mentioned arrangement. Light released from the light source 7 has its one portion reflected by the reflector, and this is made incident on the light incident face of the light guide 8. The light, which has been made incident on the light incident face of the light guide 8, is allowed to proceed along the shape of the light guide 8 while repeating total reflections inside the light guide 8, and released from the light releasing face. The light, released from the light releasing face of the light guide 8, is made incident on the concave mirror 9 while being diffused in a delta shape.

The light, reflected by the concave mirror 9, is made incident on the cylindrical lens 10 as parallel light rays in the lateral direction in FIG. 1, and in the longitudinal direction in FIG. 1, it is made incident on the cylindrical lens 10 as slight diffused light rays. In the lateral direction, the light, which has been made incident on the cylindrical lens 10, is allowed to proceed straight inside the cylindrical lens 10, pass through the exposing head 11 and reach the printing paper 12. In the longitudinal direction, the light is converged by the cylindrical lens 10, and after passing through the exposing head 11, is converged onto a fine area on the printing paper. Here, simultaneously as the printing paper 12 is transported in the longitudinal direction in FIG. 1, scanning exposure is carried out by changing the image display in the exposing head 11 so that a desired image is printed onto the printing paper 12.

Figure 4:
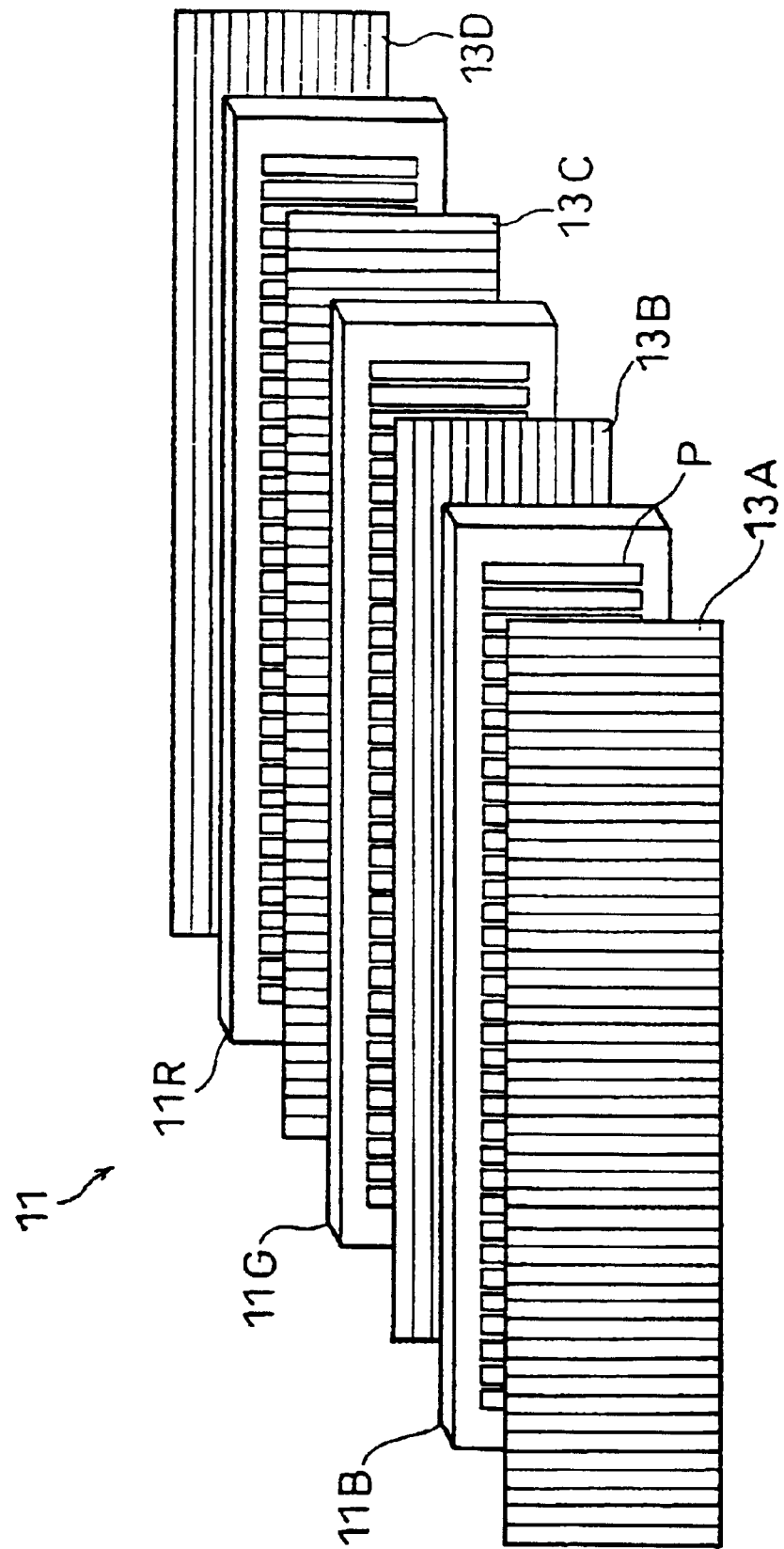
FIG. 4 is an exploded perspective view that schematically shows the construction of an exposing head installed in the exposing section.

Referring to FIG. 4, a detailed explanation will be given of the construction of the exposing head 11. FIG. 4 is an exploded perspective view that schematically shows the construction of the exposing head 11. As illustrated in FIG. 4, the exposing head 11 is constituted by LCS's 11B, 11G and 11R corresponding to respective colors of blue, green and red, and four polarizing plates 13A, 13B, 13C and 13D. Here, the LCS 11B is placed between the polarizing plates 13A and 13B, the LCS 11G is placed between the polarizing plates 13B and 13C, and the LCS 11R is placed between the polarizing plates 13C and 13D; and these sets are superposed with each other.

A plurality of pixel apertures P are formed in each of the LCS's 11B, 11G and 11R. The pixel apertures P are aligned in one row in each of the LCS 11B, 11G and 11R, and the direction of the row consisting of these pixel apertures P is coincident with the main scanning direction.

Each of the pixel apertures P has an elongated shape in the sub scanning direction. This construction is made so as to enhance the efficiency of use of light, with respect to the light which has been converged in the longitudinal direction, that is, in the sub scanning direction, by the cylindrical lens 10, and which is allowed to pass through each pixel aperture P, and directed onto the printing paper 12. In other words, although each pixel aperture P has the elongated shape in the sub scanning direction, when the light is directed onto the printing paper 12, it is converged in the sub scanning direction and the resulting exposure is made as a fine area.

As described above, the respective LCS's 113, 11G and 11R, each formed with a plurality of pixel apertures P aligned in the main scanning direction, are aligned in a superposed manner in the light axis direction. Further, with respect to the pixel apertures P formed in the respective LCS's 11B, 11G and 11R, the LCS's 11B, 11G and 11R are arranged so that the corresponding pixel apertures P are aligned on a straight line in the direction parallel to the light axis. In other words, the light, made incident on the exposing head 11, are directed to the printing paper 12 through the respective pixel apertures P of the LCS's 11B, 11G and 11R.

The polarizing plates 13A, 13B, 13C and 13D are aligned with each having an offset in the direction of the polarization axis by 90° in succession. In other words, the polarizing plates 13A and 13C are placed so as to have the same direction of the polarization axis, and the polarizing plates 13B and 13D are placed so as to have the same direction of the polarization axis, with the offset in the polarization axes of the two groups being set to 90°. Therefore, the respective LCS's 11B, 11G and 11R are set in the normally white mode in which, when no voltage is applied to liquid crystal at the respective pixel apertures P, light is allowed to pass through the respective pixel apertures P.

The light modulating operation in each of the LCS's 11B, 11G and 11R is explained as follows: The LCS 11B is designed to control the transmission and interruption of light having a blue component (hereinafter, referred to as B light). More specifically, in the LCS 11B, when a voltage is applied to the liquid crystal, only B light is interrupted, and light having a green component (hereinafter, referred to as G light) and light having a red component (hereinafter, referred to as R light) are transmitted. In contrast, when no voltage is applied to the liquid crystal, all the B light, G light and R light are transmitted.

The LCS 11G is designed to control the transmission and interruption of G light. More specifically, in the LCS 11G, when a voltage is applied to the liquid crystal, only G light is interrupted, and R light and B light are transmitted. In contrast, when no voltage is applied to the liquid crystal, all the B light, G light and R light are transmitted.

In the same manner, the LCS 11R is designed to control the transmission and interruption of R light. More specifically, in the LCS 11R, when a voltage is applied to the liquid crystal, only R light is interrupted, and G light and B light are transmitted. In contrast, when no voltage is applied to the liquid crystal, all the B light, G light and R light are transmitted.

As described above, the exposing head 11 is designed to print a desired color on printing paper 12 based upon the subtractive color process by controlling ON/OFF of the voltage to be applied to the liquid crystal for each pixel in the respective LCS's 11B, 11G and 11R. Here, with respect to fine control on color tones, it is carried out by controlling the ON/OFF time of the voltage to be applied to the liquid crystal, for each pixel in the LCS's 11B, 11G and 11R, that is, by controlling the irradiation time of lights having the respective color components.

Next, an explanation will be given of a controlling operation for interrupting/transmitting only light having a specific wavelength by controlling ON/OFF of the voltage to be applied to the liquid crystal.

FIGS. 6(a) through 6(e) are explanatory drawings that show changes in polarization caused by phase differences between the longitudinal wave and lateral wave of light. A linearly polarized light ray with a phase difference of 0 (FIG. 6(a)) forms an elliptically polarized light ray at the time of a phase difference of $\pi/4$ with the polarizing direction at the time of a phase difference of 0 and its major-axis direction being coincident with each other (FIG. 6(b)), and also forms a circularly polarized light ray at the time of a phase difference of $\pi/2$ (FIG. 6(c)). Moreover, at the time of a phase difference of $\pi/4$, it forms an elliptically polarized light ray with the polarizing direction at the time of a phase difference of 0 and its major-axis direction making an angle of 90° (FIG. 6(d)), and at the time of a phase difference of π, it forms a linearly polarized light ray with the polarizing direction at the time of a phase difference of 0 and its major-axis direction making an angle of 90° (FIG. 6(e)).

In a state where no voltage is applied to the liquid crystal layer, the light transmitted to the liquid crystal layer has its phase difference changed by π. Therefore, as described above, in the case when the LCS's 11B, 11G and 11R are set in the normally white mode, that is, in the case when the polarization axis of the polarizing plate on the incident side of each of the LCS's 11B, 11G and 11R is aligned so as to make an angle of 90° with the polarization axis of the polarizing plate on the light-releasing side, in a state where no voltage is applied, a linearly polarized light ray, which has passed through the polarizing plate on the incident side of the liquid crystal panel LCD, is subjected to a phase difference of π with the result that its polarized state is inclined by 90°; thus, it is allowed to pass through the polarizing plate on the light-releasing side.

As illustrated in FIGS. 6(a) through 6(e), the polarized light is changed by phase differences in the longitudinal wave and lateral wave of light, and the amount of generation of the phase difference exerted at the time of light transmission through the liquid crystal layer is different depending on wavelengths. Therefore, by properly setting the characteristics of the liquid crystal layer, it becomes possible to completely interrupt light having a specific wavelength, in a state where a voltage is applied thereto.

With respect to the setting method of characteristics of the liquid crystal layer, various methods, such as changing the liquid crystal material and changing the thickness of the liquid crystal layer, are listed, and the method for changing the thickness of the liquid crystal layer enables the setting of characteristics of the liquid crystal layer appropriately with ease.

For example, in the case of the LCS 11B having a liquid crystal layer whose characteristic is set so as to interrupt only B light upon application of a voltage, the phase differences and polarized states of the light rays having the respective colors are described as follows:

First, in the case when no voltage is applied to the liquid crystal layer, with respect to all the B light, G light and R light, the phase difference between the incident light and released light is virtually π. Therefore, a light ray, which has passed through the polarizing plate on the light-incident side and is formed into a linearly polarized light ray, is further converted into a linearly polarized light ray with its polarization direction tilted by 90° while passing through the liquid crystal layer; therefore, the polarization direction is virtually coincident with the polarization axis of the polarizing plate on the light-releasing side so that most of the light ray is allowed to pass through the polarizing plate on the light-releasing side and released therefrom.

On the other hand, in the case when a voltage is applied to the liquid crystal layer, only B light has a phase difference of 0 between the incident light and the released light, while each of G light and R light has a phase difference that virtually remains at π. Therefore, among light rays that have passed through the polarizing plate on the light incident side and converted into linearly polarized light rays, only B light is not subjected to a rotation in the polarization direction when it is passing through the liquid crystal layer, and is not allowed to pass through the polarizing plate on the light-releasing side. With respect to G light and R light, as in the case of no application of voltage to the liquid crystal layer, most of the light rays which have been made incident on the polarizing plate on the light incident side are allowed to pass through the polarizing plate on the light-releasing side and released therefrom.

By utilizing the function as described above, the LCS 11B controls the transmission and interruption of light only with respect to B light. In the same manner, the LCS's 11G and 11R control the transmission and interruption of light on G light and R light respectively.

Figure 5:
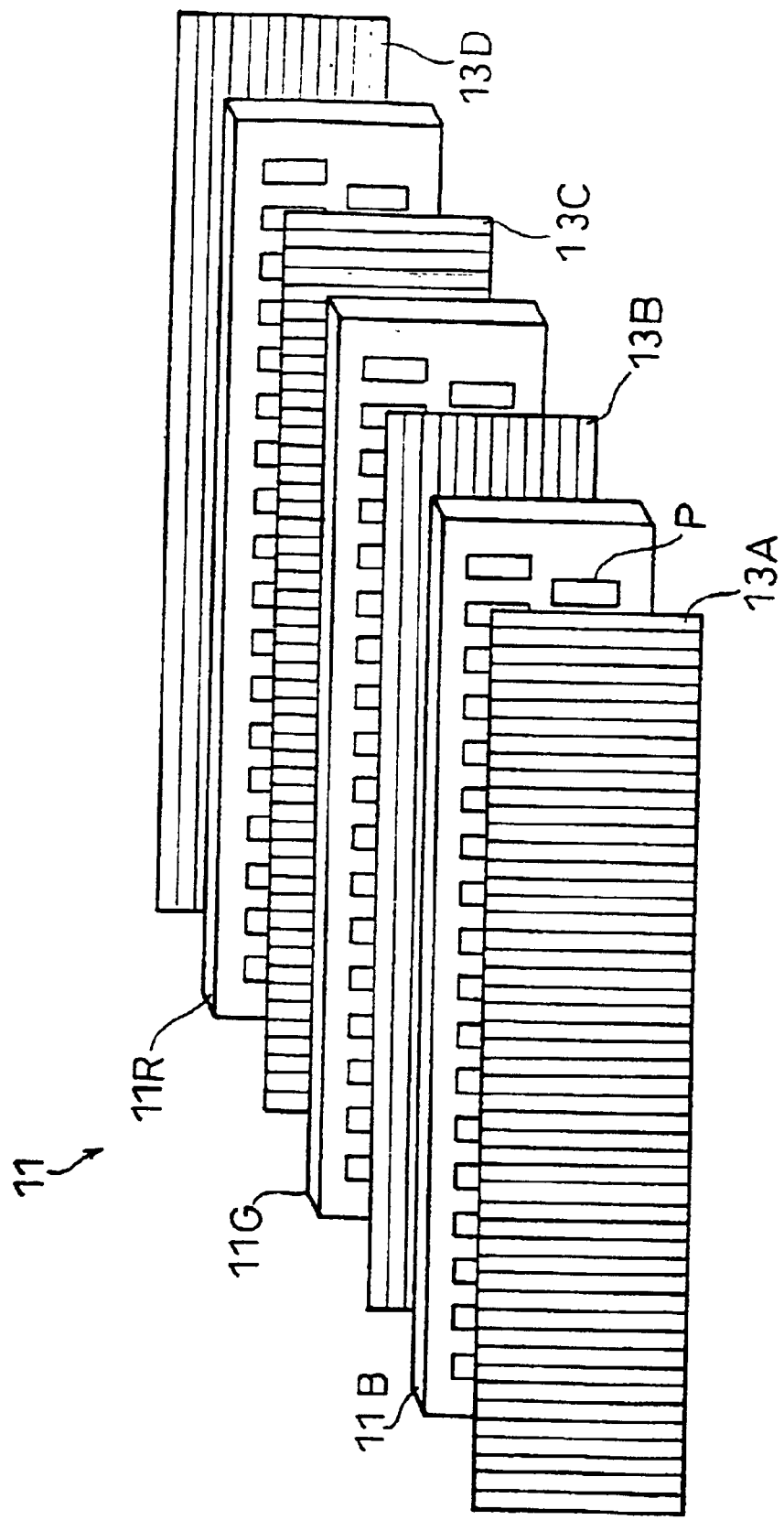
FIG. 5 is an exploded perspective view that schematically shows another structural example of the exposing head.
Figure 6:
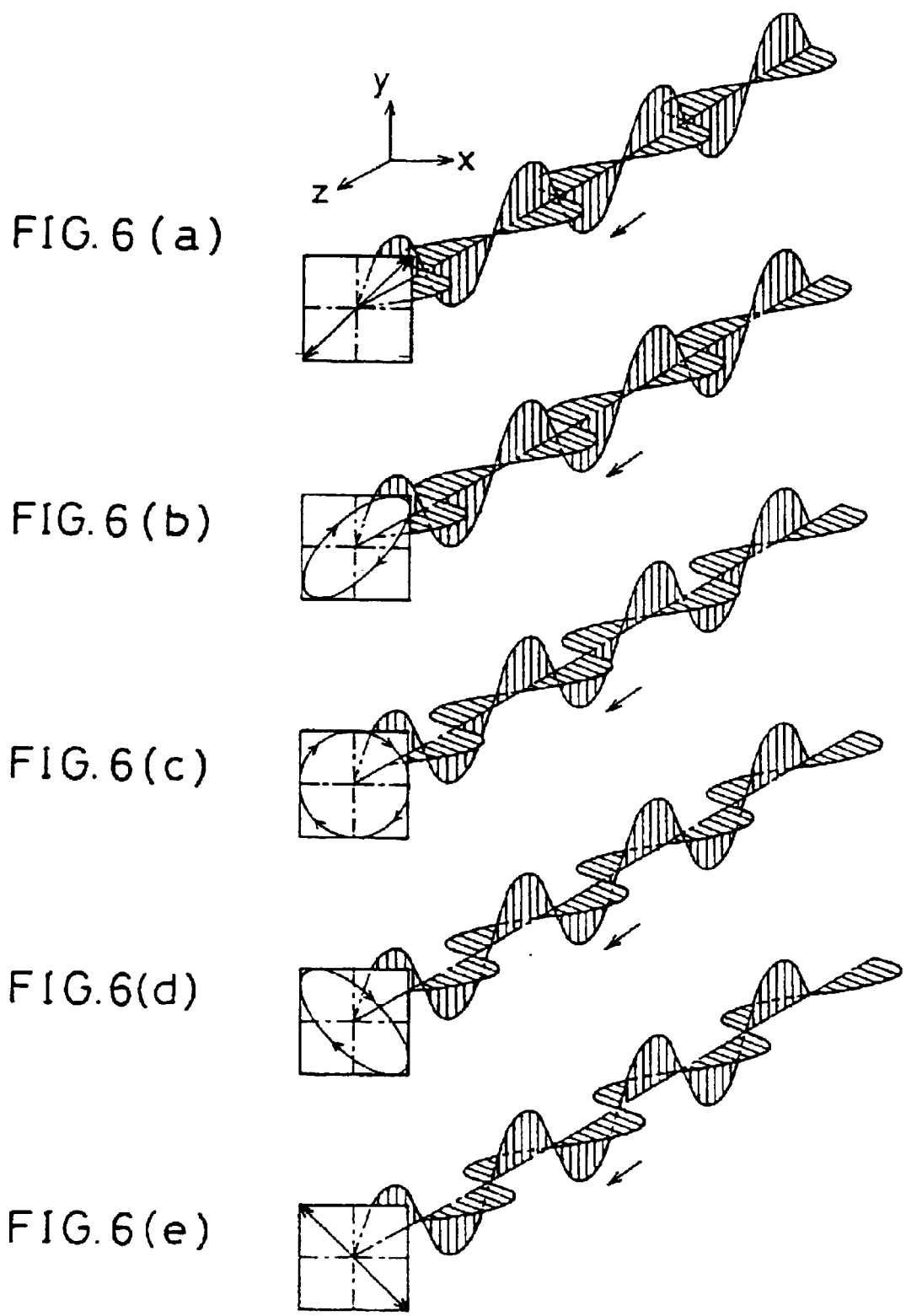
FIGS. 6(a) through 6(e) are explanatory drawings that show changes in polarization caused by phase differences.
Figure 7:
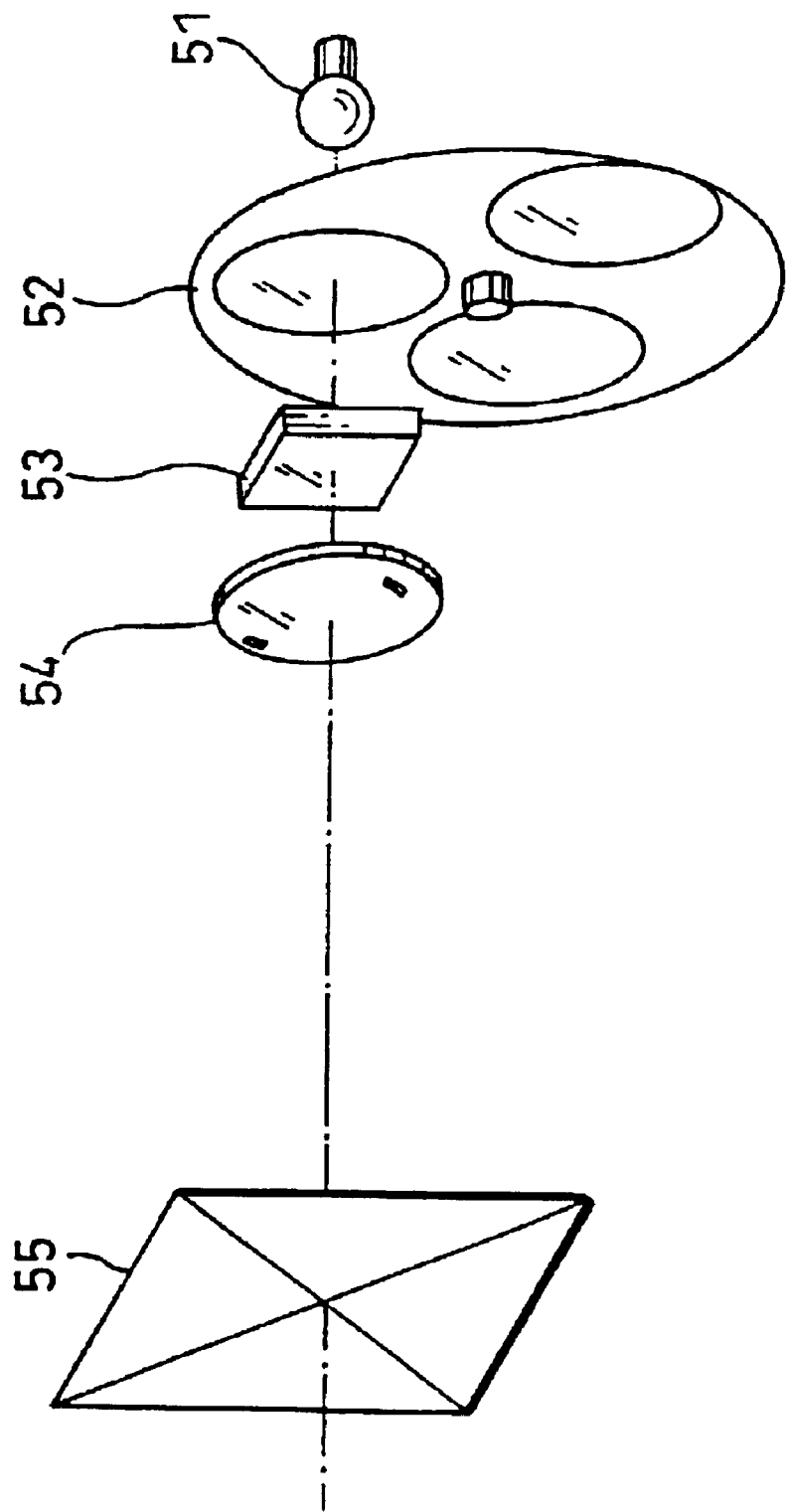
FIG. 7 is a perspective view that schematically shows the construction of a conventional printing device of one-head face exposing system.
Figure 8:
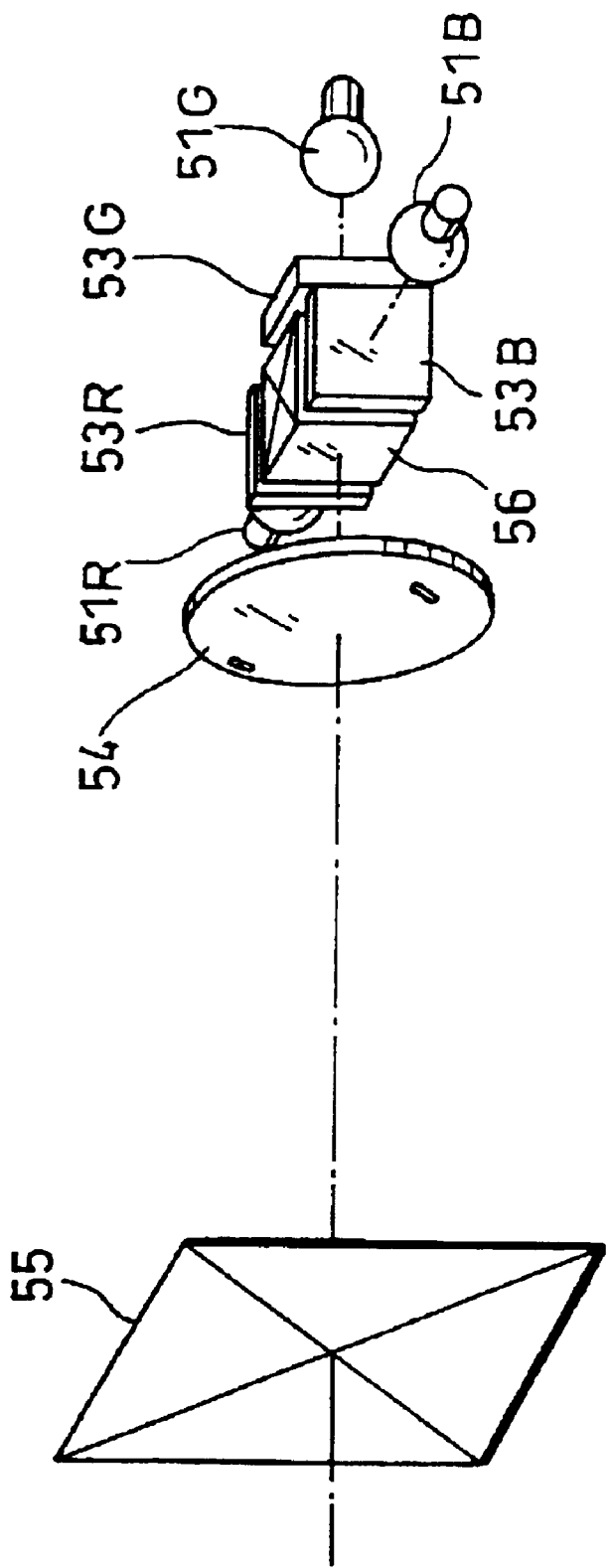
FIG. 8 is a perspective view that schematically shows the construction of a conventional printing device of three-head face exposing system.
Figure 9:
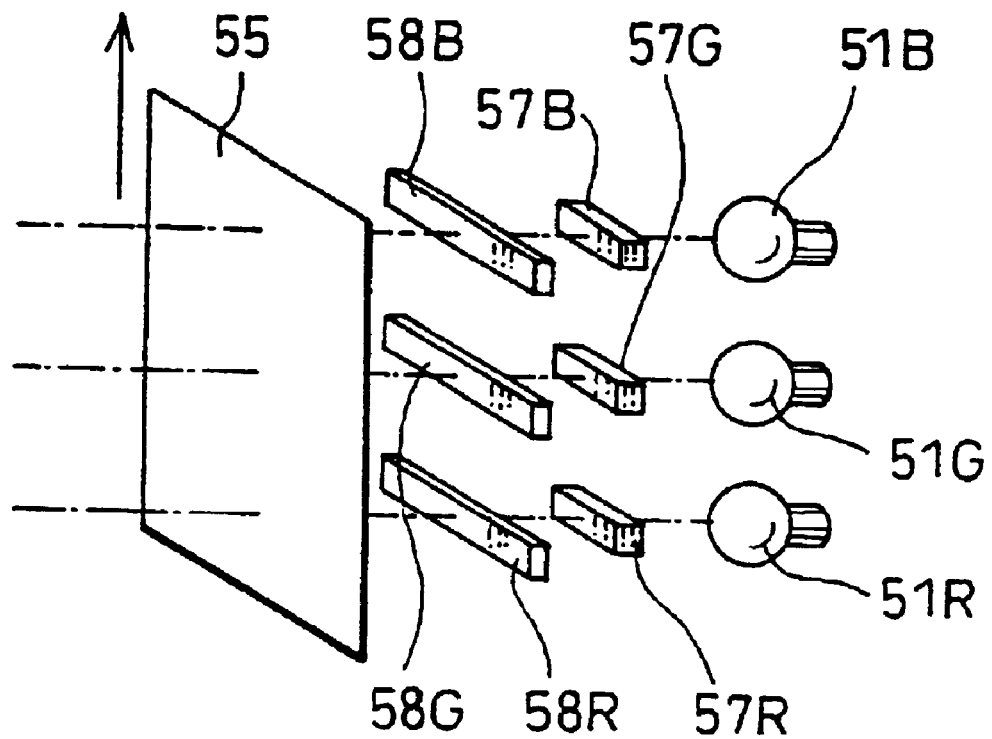
FIG. 9 is a perspective view that schematically shows the construction of a conventional printing device of three-head parallel scanning exposure system.
Figure 10:
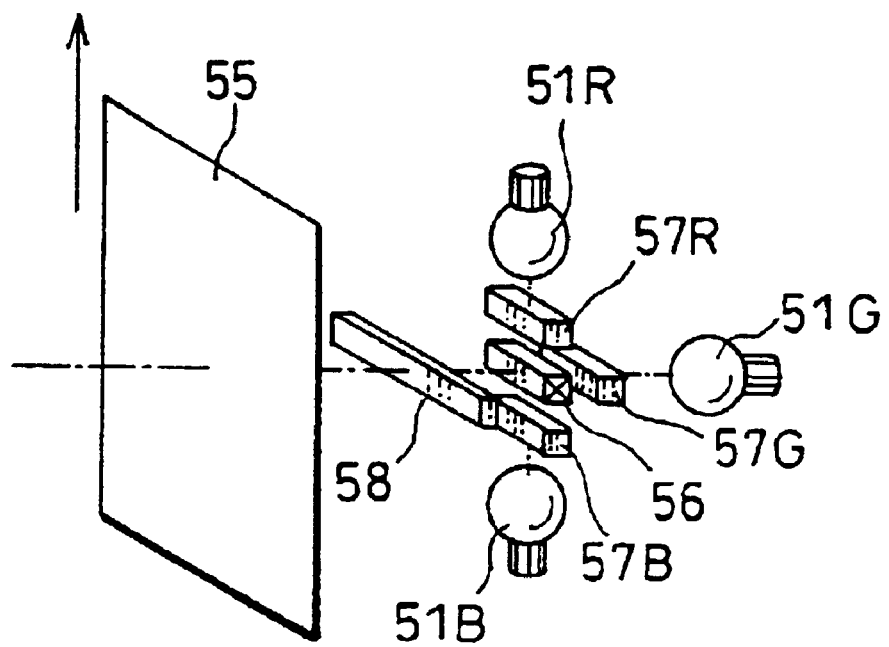
FIG. 10 is a perspective view that schematically shows the construction of a conventional printing device of three-head composition scanning exposure system.

FIG. 5 is an exploded perspective view that schematically shows a construction of an exposing head 11 which is provided with LCS's 11B, 11G and 11R having an arrangement different from that shown in FIG. 4. As illustrated in FIG. 5, in this structural example, the LCS's 11B, 11G and 11R are arranged so that the respective pixel apertures P are aligned in a manner so as to alternately offset in the sub scanning direction for every adjacent pixels. In other words, in the respective LCS's 11B, 11G and 11R, the pixel apertures P are aligned alternately in two rows.

In the case of the LCS's 11B, 11G and 11R having such an arrangement, the area of each pixel aperture P is smaller than the arrangement shown in FIG. 4. Therefore, the quantities of incident light and releasing light of each pixel aperture are smaller as compared with the arrangement shown in FIG. 4, with the result that the quantity of light directed onto printing paper 12 becomes smaller. In other words, the disadvantage of this arrangement is that in order to print the printing paper 12 using a predetermined quantity of exposing light, the exposing time needs to be lengthened, resulting in degradation in the processing capability.

However, the application of such an alignment for the pixel apertures P as shown in FIG. 5 makes it easier to properly position the respective pixels in association with the three LCS's 11B, 11G and 11R. This is because the pitch of the pixel apertures P aligned in the main scanning direction is wider in the arrangement of FIG. 5 than that in the arrangement of FIG. 4. More specifically, for example, in the case when the exposing head 11 is set to have 300 dpi, the pixel pitch required in the arrangement of FIG. 4 is 84.67 μm, while in the arrangement in FIG. 5, the pixel pitch for each row is 169.33 μm. Supposing that the aligned positions of the three LCS's 11B, 11G and 11R are slightly offset from each other in the main scanning direction, it is highly possible that in the arrangement of FIG. 4, light leakage occurs from a pixel in question to another adjacent pixel due to the narrow pixel pitch in the main scanning direction. In contrast, in the arrangement shown in FIG. 5, the pixel pitch in the main scanning direction is comparatively wide so that, even if the aligned positions of the three LCS's 11B, 11G and 11R are slightly offset in the main scanning direction, no light leakage occurs from a pixel in question to another adjacent pixel.

Moreover, as described above, since the arrangement shown in FIG. 5 makes the pixel pitch in the main scanning direction wider than that of the arrangement shown in FIG. 4, the positional precision at the time of forming the pixel apertures P in the LCS's 11B, 11G and 11R may be reduced to a certain extent. Consequently, it is possible to cut production costs.

Furthermore, black stripes need to be placed on the periphery of each pixel aperture P in the LCS's 11B, 11G and 11R, and the width of these black stripes needs to be set wider than a predetermined width. This is because, in the boundary portion between the pixels, there is an area with a certain width in which the alignment of the liquid crystal is not properly controlled and this area tends to cause light leakage that needs to be prevented. However, in the arrangement shown in FIG. 4, since the width of the black stripe between the pixel apertures is printed on the printing paper 12 as an unexposed portion, the smaller the width of the black stripe, the more preferable. Therefore, in the arrangement shown in FIG. 4, LCS's having an aperture ratio as high as possible need to be adopted, and such expensive LCS's result in high costs.

In contrast, the arrangement of FIG. 5 in which the pixel apertures P are aligned alternately in two rows makes it possible to carry out exposure in a state where the edges of adjacent pixels are superposed on each other with respect to an image printed on printing paper 12; therefore, black stripes between the pixel apertures P in the respective rows are not printed on printing paper 12 as unexposed portions. In this manner, even in the case of the application of LCS's having a comparatively small aperture ratio, it is possible to carry out printing without any problems, and consequently to reduce production costs.

As described above, in the exposing section 6 installed in the photograph processing apparatus, the exposing head 11 has an arrangement in which the three LCS's 11B, 11G and 11R are aligned in the light axis direction in association with respective pixels, and color tones in the respective pixels with respect to an image printed on printing paper 12 are controlled based upon the subtractive color process by controlling transmission and interruption of light rays having respective color components corresponding to the LCS's 11B, 11G and 11R. Therefore, it is possible to eliminate the need for constructions such as a composition prism for composing light rays having respective color components, to simplify the structure, and consequently to reduce production costs and material costs.

Moreover, since the three LCS's 11B, 11G and 11R are aligned in the light axis direction, it is possible to make the size of the exposing head 11 itself comparatively smaller. Therefore, it becomes possible to make the apparatus itself smaller, and also to increase the degree of freedom in arranging the constituent elements.

Furthermore, the three LCS's 11B, 11G and 11R are aligned in the light axis direction in association with the respective pixels, so that light rays having respective color components in the respective pixels are directed on the same position on printing paper 12. Therefore, it is possible to eliminate the generation of pixel offsets in an image printed on the printing paper 12, and consequently to provide high-quality images.

Here, since the light rays having the respective color components are simultaneously directed onto the printing paper 12, the exposing speed can be increased, for example, as compared with an arrangement in which light rays having the respective color components are exposed in series with each other.

Moreover, in the arrangement of the present invention, light from the light source 7 is reflected by the concave mirror 9, and this is transmitted through the exposing head 11 via the cylindrical lens 10, and then allowed to expose an image on printing paper 12; however, the present invention is not intended to be limited thereby. For example, another arrangement is adopted in which light from a light source is transmitted through the exposing head 11, and allowed to expose an image on printing paper 12 by using a lens array of a refractive-index distributing type or an optical fiber array. Moreover, in the arrangement of the present embodiment, the LCS's are used as means for modulating light in the exposing head 11; however, the present invention is not intended to be limited by this arrangement, and for example, PLZTs may be used. Furthermore, not limited to the scanning exposure, the face exposure may be adopted by using an LCD (Liquid Crystal Display) capable of displaying an image as a whole, in place of the LCS.

As described above, the printing device of the present invention is provided with: a light source; and an exposing means for modulating light from the light source for each pixel and for directing the resulting light to a photosensitive material, the exposing means being provided with a plurality of light modulating elements which control the transmission and interruption of light rays having respectively different specific wavelength bands and which transmit light rays having the other wavelength bands, the light modulating elements being aligned in a light-axis direction so as to correspond to the respective pixels, wherein color tones in the respective pixels with respect to an image printed on printing paper are controlled based upon the subtractive color process by allowing the respective light modulating elements to control the transmission and interruption of light rays having respectively specific wavelength bands.

Moreover, in the above-mentioned arrangement, when light is transmitted through each of the pixels, each of the light modulating elements may modulate the phase difference of only light having a specific wavelength band so as to control the transmission and interruption of the light having the specific wavelength band, and transmit light having the other wavelength bands.

With this arrangement, when light is transmitted through each of the pixels, the transmission and interruption of light having a specific wavelength band is controlled, and light having the other wavelength bands is transmitted. With respect to this means, a means for modulating the phase difference only for light having a specific wavelength band is adopted; therefore, for example, the above-mentioned means is realized by a conventional construction such as a liquid crystal display element and a PLZT.

Moreover, in the above-mentioned arrangement, the exposing means may be designed in such a manner that respective pixels are aligned in one row or a plurality rows, and that a scanning exposure system for carrying out an exposing process while the photosensitive material is being transported is adopted.

In this arrangement, since an image is printed on a photosensitive material through the scanning exposure system, the transportation of the photosensitive material and the exposing operation are carried out simultaneously. Therefore, it is possible to improve the processability.

Moreover, in the above-mentioned arrangement, the following means may be further added: a light conversion means for converting light from the light source so as to form virtually parallel light rays with respect to a plane formed by the main scanning direction and the light axis direction; and a light converging means for converging light released from the light conversion means with respect to a plane made by the sub scanning direction and the light axis direction, and in this structure, the photosensitive material is exposed by allowing the light from the light converging means to pass through the exposing means.

With this arrangement, on the plane formed by the main scanning direction and the light axis direction, the virtually parallel light rays are directed onto the photosensitive material through the exposing means; therefore, the difference in the quantities of light between the center portion and the peripheral portion in the light path can be reduced in the main scanning direction. Moreover, on the plane made by the sub scanning direction and the light axis direction, the converged light is directed through the exposing means onto the photosensitive material by the light converging means; therefore, it is possible to enhance the efficiency of use of light, and also to improve the exposing speed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A printing device comprising:

a light source; and exposing means for modulating light from the light source for each pixel and for directing the resulting light to a photosensitive material, the exposing means being provided with a plurality of light modulating elements each of which controls the transmission and interruption of light rays having respectively different specific wavelength bands and each of which transmits light rays having the other wavelength bands, the light modulating elements being aligned in a light-axis direction so as to correspond to the respective pixels, wherein color tones in the respective pixels with respect to an image printed on a photosensitive material are controlled based upon the subtractive color process by allowing the respective light modulating elements to control the transmission and interruption of light rays having respectively specific wavelength bands, and when light passes through each pixel, each of the light modulating elements modulates, in accordance with application/non-application of a voltage, a phase difference of a light ray having a specific wavelength band, so as to control the transmission and interruption of the light ray having the specific wavelength band and allows light rays having other wavelength bands to pass through in such a manner as to cause the phase difference of the light ray having the specific wavelength band to be identical to a phase difference of light rays having the other wavelength bands, in a particular state of voltage application, while, causing the phase difference of the light ray having the specific wavelength band to be different from the phase difference of the light rays having the other wavelength bands, in the other state of voltage application, so that the transmission and interruption of the light ray having the specific wavelength band are controlled and light rays having other wavelength bands are allowed to pass through.

2. The printing device as defined in claim 1, wherein the color tones of the respective pixels are controlled by adjusting the period of time for light to transmit the respective light modulating elements.

3. The printing device as defined in claim 1, wherein the light modulating element is a liquid crystal element.

4. The printing device as defined in claim 1, wherein the exposing means has an arrangement in which respective pixels are aligned in one row, and has a scanning exposure system for carrying out an exposing process while the photosensitive material is being transported.

5. The printing device as defined in claim 1, further comrprising: the exposing means has an arrangement in which respective light conversion means for converting light from the light source so as to form virtually parallel light rays with respect to a plane formed by the main scanning direction and the light axis direction in which the light is directed onto the photosensitive material; and light converging means for converging light released from the light conversion means with respect to a plane made by the sub scanning direction and the light axis direction in which the light is directed onto the photosensitive material, wherein the photosensitive material is exposed by allowing the light from the light converging means to pass through the exposing means.

6. The printing device as defined in claim 5, wherein the light converging means is a cylindrical lens.

7. The printing device as defined in claim 5, wherein the exposing means has an arrangement in which pixels, each having an elongated shape in the sub scanning direction, are aligned in one row, and also has a scanning exposing system for carrying out an exposing process while the photosensitive material is being transported.

8. A printing device comprising:

a light source; and exposing means for modulating light from the light source for each pixel and for directing the resulting light to a photosensitive material, the exposing means being provided with a plurality of light modulating elements which control the transmission and interruption of light rays having respectively different specific wavelength bands and each of which transmit light rays having the other wavelength bands, the light modulating elements being aligned in a light-axis direction so as to correspond to the respective pixels, wherein color tones in the respective pixels with respect to an image printed on a photosensitive material are controlled based upon the subtractive color process by allowing the respective light modulating elements to control the transmission and interruption of light rays having respectively specific wavelength bands, and the exposing means has an arrangement in which respective pixels are staggered in two rows, and has a scanning exposure system for carrying out an exposing process while the photosensitive material is being transported.

9. A photograph processing apparatus comprising:

a printing device for carrying out a digital exposing process on a photosensitive material based upon image data;

a developing section for developing the photosensitive material that has been subjected to the printing process by the printing device by using a developer; and a drying section for drying the photosensitive material that has been subjected to the developing process by the developing section, wherein the printing device comprises:

a light source; and exposing means for modulating light from the light source for each pixel and for directing the resulting light to a photosensitive material, the exposing means being provided with a plurality of light modulating elements each of which control the transmission and interruption of light rays having respectively different specific wavelength bands and each of which transmit light rays having the other wavelength bands, the light modulating elements being aligned in a light-axis direction so as to correspond to the respective pixels, wherein color tones in the respective pixels with respect to an image printed on the photosensitive material are controlled based upon a subtractive color process by allowing the respective light modulating elements to control the transmission and interruption of light rays having respectively specific wavelength bands, and when light passes through each pixel, each of the light modulating elements modulates, in accordance with application/non-application of a voltage, a phase difference of a light ray having a specific wavelength band, so as to control the transmission and interruption of the light ray having the specific wavelength band and allows light rays having other wavelength bands to pass through in such a manner as to cause the phase difference of the light ray having the specific wavelength band to be identical to a phase difference of light rays having the other wavelength bands, in a particular state of voltage application, while, causing the phase difference of the light ray having the specific wavelength band to be different from the phase difference of the light rays having the other wavelength bands, in the other state of voltage application, so that the transmission and interruption of the light ray having the specific wavelength band are controlled and the light rays having other wavelength bands are allowed to pass through.

* * * * *